May 2, 1961 C. F. CARLSON ET AL 2,982,647

ELECTROSTATIC IMAGE REPRODUCTION

Filed June 14, 1956

3 Sheets-Sheet 1

INVENTORS
CHESTER F. CARLSON
HAROLD BOGDONOFF

BY Frank A. Steinhilper

ATTORNEY

May 2, 1961 C. F. CARLSON ET AL 2,982,647

ELECTROSTATIC IMAGE REPRODUCTION

Filed June 14, 1956 3 Sheets-Sheet 2

*INVENTORS*
CHESTER F. CARLSON
HAROLD BOGDONOFF

*BY*

Frank A. Steinhilper

ATTORNEY

INVENTORS
CHESTER F. CARLSON
HAROLD BOGDONOFF
BY
Frank A. Steinhilper
ATTORNEY

United States Patent Office 2,982,647
Patented May 2, 1961

2,982,647

ELECTROSTATIC IMAGE REPRODUCTION

Chester F. Carlson, Pittsford, and Harold Bogdonoff, Rochester, N.Y., assignors, by mesne assignments, to Haloid Xerox Inc., Rochester, N.Y., a corporation of New York Filed June 14, 1956, Ser. No. 591,775
7 Claims. (Cl. 96—1)

This invention relates to methods of transferring electrostatic images, and to the application of such methods to xerography and other electrostatic image processes. This is a continuation-in-part of United States patent application Serial Number 358,446, filed May 29, 1953.

The invention contemplates methods of transferring electrostatic latent images from a first surface to a second surface of insulating material and to the manipulation and development of such electrostatic images. A feature of the invention comprises the transfer of an electrostatic latent image which has been previously formed on an insulating surface to a second surface of insulating material by bringing said second surface into contact with or close proximity to the image-bearing surface and producing an intense electric field between said surfaces and separating said surfaces to cause a transfer of electric charges between said surfaces in a direction determined by the applied field to form a transferred electrostatic latent image.

In one embodiment of the invention an electrostatic latent image which has been produced on an electrophotographic or xerographic plate is transferred to the insulating surface of a sheet of paper where it may be developed on the paper with a finely-divided material, such as an electroscopic powder, to produce a permanent visible image which can be affixed to the paper or transferred to another surface. The paper, or at least its surface, is made sufficiently insulating to hold the electrostatic image by providing a moisture-insensitive coating thereon or by reducing the moisture content of the paper to a low value.

Heretofore, in electrostatic image processes, such as xerography, it has been the practice to develop the electrostatic images by depositing solid or liquid material directly on the surface on which they were originally formed, or on an insulating sheet laid on such surface, as shown, for example, in Carlson Patent 2,297,691. It has not heretofore been thought possible or practicable to make a transfer of an undeveloped invisible electrostatic image from one surface onto another surface which surface carrying the transferred image may be removed from the first surface and developed, if desired, at a location remote from the first surface.

In the preferred method of practicing the invention, a positive charge is applied to the insulating sheet which is intended to receive the electrostatic image. The charge may be applied to one or both surfaces of the transfer sheet and, in some cases, a positively charged electrode may be positioned behind the insulating sheet during transfer of the electrostatic image which may, if desired, superimpose an external uniform field.

Another aspect of the invention, which may, however, be present in the same embodiment, is the discovery that a positive charge on the insulating transfer sheet may be used to effect a transfer of an image which is originally present as a positively charged area on the original image plate.

Figure 1:
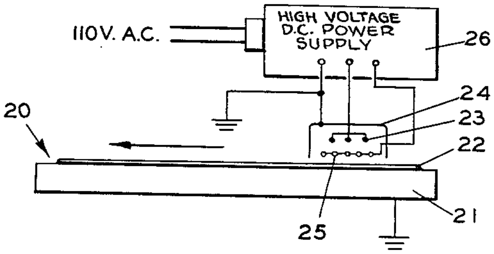
Figure 1 shows the first step in one method of forming an electrostatic latent image which is to be transferred according to the method of the present invention, this step comprising the charging of an electrophotographic or xerographic plate.
Figure 2:
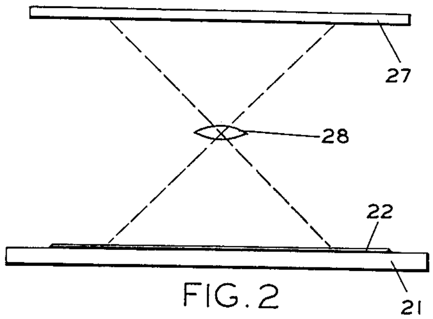
Figure 2 illustrates the exposure of the charged plate to a light image.

Referring to the drawings, Figures 1 and 2 illustrate the now more or less conventional method of producing an electrostatic latent image on an electrophotographic or xerographic plate. The xerographic plate 20 comprises a metal backing plate 21 carrying a layer of photoconductive insulating material 22, such as anthracene, sulphur, vitreous selenium or the like. The backing 21 is preferably of metal, but it may in some instances be formed of other materials, such as paper. In the practice of the present invention, excellent results have been achieved with selenium coatings of various thicknesses, such as 20 microns and 80 microns, on polished aluminum base plates. Thin interlayers between the photoconductor and the base plate and on top of the photoconductor can be provided, if desired, to improve the performance of the plate.

A uniform electrostatic charge is applied in the dark to the surface of layer 22 by any suitable method, such as by passing a high potential ion source over the plate. As shown in Figure 1, the ion source may comprise a corona discharge device of the type described in Lewis E. Walkup application Serial Number 154,295, filed April 6, 1950, for Charging Device. This comprises a grid of fine wires 23 held at several thousand volts potential with respect to a grounded metal channel member 24 which provides a housing around the top and sides of the grid, whereby a corona discharge is produced around the wires. A control grid 25 of coarser wires is located between the corona grid 23 and coating 22 on grounded plate 21, the second grid being held at an intermediate potential such as several hundred volts above ground potential. Grid 25 serves to control or limit the potential placed upon the coating 22 and prevent overcharging. The potentials are supplied by a high voltage power supply circuit 26, such as a transformer-rectifier circuit and a voltage dividing resistance for supplying the required potentials to grids 23 and 25.

After charging, the coating 22 is exposed to radiation, such as a light image, as shown in Figure 2, in which the lines and letters from the face of an illuminated printed sheet 27 are focused by lens 28 onto the surface of coating 22. During exposure the electrostatic charge which has been applied to the surface is dissipated in the areas which are struck by light to leave a charge pattern remaining where light did not reach the plate, as in the black lines and letters of the image. This is the electrostatic latent image which heretofore has been developed directly on the plate by bringing finely-divided material, such as a fine powder, into contact with coating 22. Electrostatic images can be formed on insulating surfaces in several ways, as by exposing a charged insulating layer to X-ray or other radiation patterns which will render it conductive, or by depositing charges on an insulating layer in the form of a pattern or image. Other electrostatic images or electric images, for example, of the type described in Schaffert, United States Patent 2,576,047 in which insulating material is used with conductive background thereby defining an electroprinting plate which differentiates image areas from background areas depending on whether the material is insulating or conductive may also be used as the original charge pattern or image to be transferred within the scope of this invention. The images produced by the various methods can be continuous tone patterns in which the charge varies gradually in density from point to point, or images with large black, gray, and white areas as well as images of lines and characters.

In the prior methods in which an electrostatic image was developed directly on a xerographic plate surface, it has been necessary to subsequently transfer the powder or other developing material to another surface and clean the plate before it could be used to produce another image. The other alternative was to affix the image to the plate itself, in which event a plate was consumed for each image produced.

The present invention contemplates a radical departure from such prior methods in that the electrostatic image is not developed with powder or liquid directly on the xerographic plate, but the electrostatic image itself is transferred to another insulating surface where it may be developed.

Figure 3:
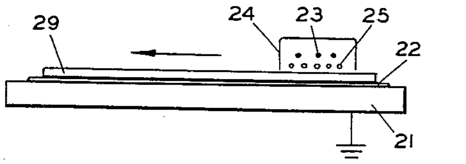
Figure 3 shows the first step in transfer of the electrostatic image to the insulating surface of a transfer sheet such as paper or plastic sheet material.

Figure 3 shows a step in one method of practicing the invention. According to this method, a sheet of insulating material 29 is laid in intimate contact with the face of coating 22 carrying an electrostatic image and a high potential ion source is passed over the back of the sheet to deposit electrostatic charges thereon in a more or less uniform distribution.

The insulating sheet may be a sheet of insulating plastic material, such as cellulose acetate, ethyl cellulose, polystyrene, polyethylene, and the like, or paper in insulating condition. Almost any smooth-surfaced or calendered paper can be used by reducing its moisture content to a very low value. One method of achieving this is to keep the paper in a chamber containing a dessicant. Another method is to prebake the paper by placing it in a moderately heated oven and raising it to a temperature of 200 to 300 degrees Fahrenheit for from a few seconds to a few minutes. While the baked sheet may be used immediately, it is more desirable to place it in a dessicated chamber for at least a few minutes after baking to allow it to cool to room temperature and permit it to reach a uniform condition. It is contemplated that paper can be manufactured for practicing the method of this invention by baking and then packaging in sealed packages containing a dessicant to keep the paper in condition for use.

Smooth, uncoated paper can be used provided it is kept in a dry atmosphere, below about 10% relative humidity, until the electrostatic image has been transferred and developed with powder, but it is found that cellulose absorbs moisture very rapidly, so that at 20 to 30 percent relative humidity, and higher, it is difficult to transfer an electrostatic image and maintain its sharpness until development can take place unless done rapidly in in automatic equipment, for example. It is therefore preferred that the paper be sized with an insulating resin, impregnated with a plastic such as ethyl cellulose, polystyrene, cellulose nitrate, or cellulose acetate, or, still more preferably, coated on one or both sides with a surface coating of these or other plastic materials. In this event, it is often possible to dispense with a special drying step provided operations are performed under low or moderate humidity conditions, such as below 40% relative humidity, or even under higher humidities provided the steps are performed with sufficient rapidity.

Although moisture insensitive plastic coatings yield the best results, it has also been found feasible to use moisture sensitive coatings such as gelatin. Photographic base stock comprising paper coated with baryta and gelatin without silver salts, if predried, retains its insulating properties sufficiently long to permit images to be produced and developed at 30% relative humidity in a processing cycle as long as 15 to 30 seconds. It is also sometimes possible to use humidity-sensitive paper coated on one face with an insulating coating. If one face is insulating, good images can still be obtained even with substantial conductivity in the backing layer.

Other materials which are useful for transfer sheets include library and punched card stock and cards and paper faced with a glossy cast surface of zinc caseinate, as described, for example, in United States Patent 2,346,812.

For the preliminary step in transferring the electrostatic image as shown in Figure 3, the ion source may comprise the same or a similar screen-controlled corona discharge unit to that shown in Figure 1. As the ion source passes over the back of insulating sheet 29 the ions created are driven by the field between grid 25 and backing plate 21 to the back surface of sheet 29 upon which they deposit an electrostatic charge. To produce an electrostatic transfer of an image, it is necessary that the back of the sheet be raised by the deposited charge to a fairly high potential, such as above 500 to 100 volts, with respect to plate 21, depending on the thickness and dielectric constant, in order to create a field of sufficient strength between layers 22 and 29 to cause a transfer of charges in a manner discussed more fully below. As will be discussed further in connection with Figures 12 to 16, the applied charge may be of either positive or negative polarity for electrostatic images of positive polarity and likewise for images of negative polarity. With selenium plates carrying positive electrostatic images best results have been obtained by using a positive transfer polarity.

After the ion source has been passed over sheet 29 one or more times in the dark to strongly charge the back of the sheet and raise it to the required potential, the sheet is peeled off the xerographic plate, which may bring about transfer as is discussed more fully hereinafter, and the electrostatic image which has been formed on the face of sheet 29 is developed, if desired, by bringing a finely-divided material, such as powder or a liquid mist, adjacent to the face of the sheet. Any of the known xerographic developing methods can be used, such as exposing the sheet to a powder cloud comprising a suspension of fine, charged powder particles in air or another gas, or brushing a powder lightly over the image, or by sprinkling a fine powder onto the sheet and blowing off the excess which does not adhere to image areas, or by tumbling a powder or powder-carrier mixture over the sheet.

Figure 4:
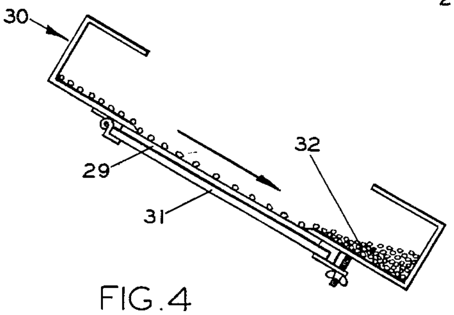
Figure 4 illustrates the development of the transferred electrostatic image by cascading an electroscopic developing powder over the insulating surface to which the image has been transferred.

Figure 4 illustrates one method of development in which the sheet 29 is mounted in an opening in the bottom of a developing tray 30 where it is clamped by a hinged metal backing plate 31. The tray is then tilted back and forth to cascade a powder-carrier developer 32 over the image surface as indicated. One suitable developer is of the type described in Walkup and Wise Patent 2,638,416, issued May 12, 1953, for Developer Composition for Developing Electrostatic Latent Images. As the mixture cascades over the face of sheet 29 powder particles attach themselves to the electrostatic image areas to produce a powder image on the sheet corresponding to the electrostatic image which was transferred.

It is usually desired to deposit a dark powder on the areas corresponding to the dark areas or lines on the original. This is accomplished by using a powder which carries a charge of opposite polarity to these image areas. Reversal prints can also be made, however, by using a powder charged to the same polarity as the original dark areas, in which case a positive print can be produced from a photographic negative.

Figure 5:
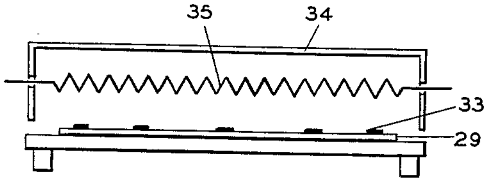
Figure 5 shows the final process step which comprises fusing the developed powder image onto the sheet surface to affix it to the transfer sheet and form a permanent print.

Figure 5 shows the final step in making a print, which comprises fixing the image by placing the sheet 29 carrying powder image 33 in an oven 34 heated by electric element 35 to a temperature above the fusing temperature of the developing powder to cause fusion of the powder image onto the sheet, after which the completed fixed copy may be removed ready for use. Other known techniques of fusing may also be used.

Figure 6:
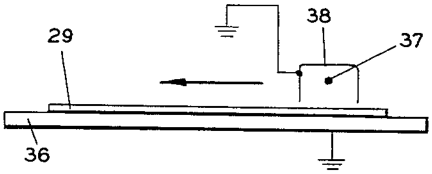
Figure 6 shows a step of precharging the transfer sheet prior to the performance of the step shown in Figure 3, according to a modified method of operation.

Figure 6 shows a precharging step which may be given to transfer sheet 29 prior to the step of Figure 3. The sheet 29 is laid on a grounded metal plate 36 and a high voltage ion source 37 is passed over the sheet to lay down a uniform charge on its surface. The ion source may be a controlled source similar to that of Figure 1, or it may be a simpler one comprising a single corona wire 37 held at a high potential and enclosed on three sides with a grounded metal channel 38. While this unit may be substituted for the ion source of Figures 1 and 3 in the various steps, it has less accurate control of the potentials laid down. Either the face or the back of sheet 29 can be precharged, but best results are obtained by precharging the face of the sheet. The same polarity of charge is used as will subsequently be used in the transfer step.

If the electrostatic image is positive in electrical polarity, the face of the sheet 29 will preferably be charged with a uniform positive electrostatic charge. This face is then laid against the image and a positive high voltage ion source is passed over the back of the sheet, as in Figure 3, to initiate the transfer operation. A less preferable method comprises charging the back of the transfer sheet negatively, then placing the face of the sheet against the xerographic plate carrying a positive electrostatic image and passing a high voltage negative ion source over the assembly.

Figure 7:
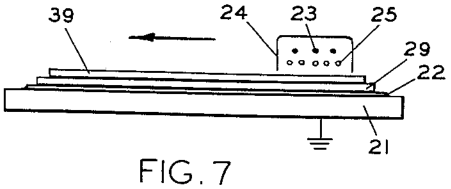
Figure 7 illustrates a modification of the preliminary transfer step of Figure 3.
Figure 8:
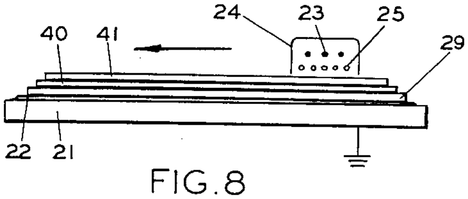
Figure 8 shows a further modification of the preliminary transfer step.
Figure 9:
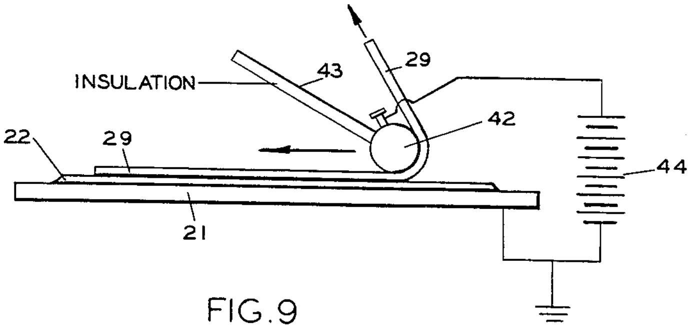
Figure 9 shows another method of performing the transfer according to the present invention.

Figures 7 to 9 illustrate variations in the transfer technique which in most cases yield further improved results. Figure 7 shows a transfer step which is similar to that of Figure 3 with the exception that an additional sheet 39 is laid over the back of the transfer sheet 29. Sheet 39 may be a second insulating sheet, such as a thin sheet of paper, cellulose acetate, polystyrene or the like, but is preferably a conductive sheet, such as a metal plate or foil. After passage of the ion source over the assembly, the sheets 29 and 39 are preferably removed as a unit after which sheet 29 is developed either with or without the backing sheet 39 still in contact. Best results are obtained with metal backings when the backings are kept charged until the transfer sheet and backing are removed as a unit from the image surface.

Figure 8 shows an embodiment in which an insulating sheet 40 is laid over the transfer sheet 29 and a metal plate or foil 41 is placed on top of the insulating sheet. Operation is similar to the method of Figure 7.

The ion source used in Figures 3, 7 and 8 provides a particularly convenient means for spreading a uniform charge over the back of the transfer sheet with or without superimposed layers. As charges are laid down, the ion cloud is driven by the field to the areas still in need of charge until the entire area traversed by the ion source is covered. However, when a metal plate or foil is used as layer 39 or 41 in the assemblies of Figures 7 and 8, it is not always necessary to use the ion source as the conductive plate will itself distribute any potential uniformly over its surface. It is therefore contemplated that a high potential terminal can be touched directly to the metal plate or foil. The connection can be momentary or it can be maintained while the plate and transfer sheets are removed from the image plate. It is preferred that the plate or foil 39 be kept at the high potential while the layers 29 and 39 are removed as a unit from layer 22. This may be done by keeping the connection to the potential source, or by keeping plate 39 electrically insulated after it has been charged.

Further improved results are obtained with the methods of Figures 7 and 8 if a precharging step is given to the face of sheet 29 as in Figure 6 but with the further modification that the layers 39 and 40, 41 are placed in position against the back of sheet 29 prior to the step of Figure 6 and the sheets are kept assembled until transfer of the electrostatic image has been completed.

Figure 9 illustrates another variation of the transfer method in which the transfer sheet 29 is laid on the xerographic plate after which a conductive rod or roller 42 is placed against the back of the sheet while it is held by insulating handle 43. The rod or roller is charged to a high potential by a voltage source, such as battery 44, which has its other terminal connected to the xerographic backing plate 21. To effect a transfer the rod or roller is pressed against sheet 29 with moderate pressure and is slowly drawn over the back of the sheet as the sheet is drawn upward around the rod or roller and away from the image surface 22. The voltage applied to the rod or roller will depend on the thickness and dielectric constant of sheet 29. With a cellulose nitrate coated paper 12 mils thick potentials between 1500 and 2500 volts gave best results.

Figure 10:
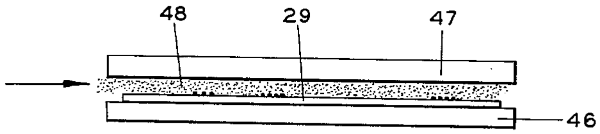
Figures 10 and 11 illustrate modified methods of development for making the transferred electrostatic images visible.
Figure 11:
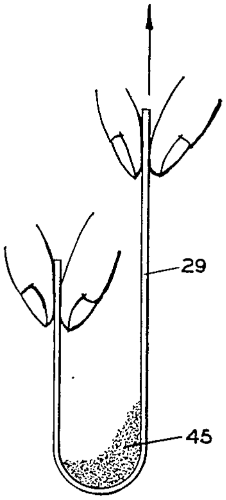

Figures 10 and 11 show modified development methods for developing the transferred electrostatic images. In Figure 10 the sheet 29 carrying an electrostatic image is held against a metal plate 46 with its image surface facing a second plate 47 across a short air gap, such as 1/16 inch. An air suspension of charged powder or ink droplets 48 is then blown through the air space to produce a deposit on the image. By applying various potential differences between plates 46 and 47 the character and density of the image can be controlled during development.

Figure 11 shows a method of development of the sheet 29 which comprises holding the sheet to form a channel with the image surface inward and drawing one end upward as shown to roll a charge of developing powder or powder-carrier mixture 45 over the image surface. This method yields images of excellent quality and density which are at the same time extremely clean in the background areas.

Figures 12 to 18 will be referred to in the following discussion of certain theories of operation of the electrostatic transfer and development processes which have been described. It is intended, however, that the invention be construed as broadly as the specification and claims permit without unnecessary limitation to any specific theory of operation.

Figure 12:
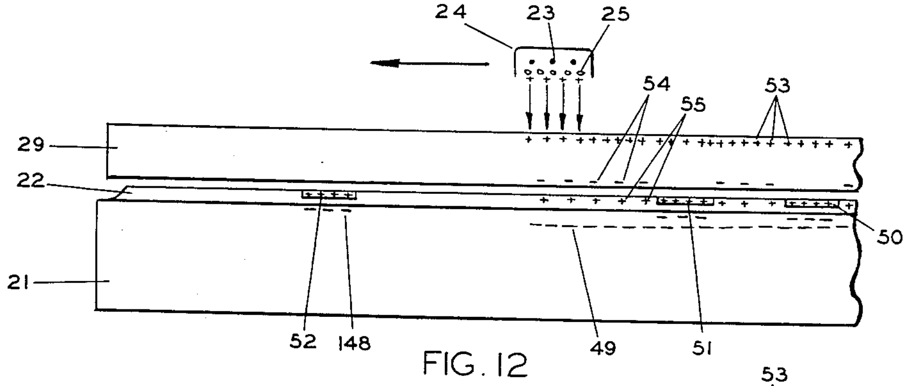
Figure 12 is a diagram illustrating a theory of the operation of one method of transferring an electrostatic image.

In Figure 12 is indicated the electrical process which is believed to take place during the transfer step of Figure 3 when a positively charged electrostatic image is transferred from the photoconductive insulating layer of a xerographic plate to a sheet of insulating material which originally has no charge of any kind. A high potential positive ion source 23, 25 is used to effect the transfer. The electrostatic image on the xerographic plate is represented by three groups of four plus signs 50, 51 and 52 enclosed in rectangular boxes to indicate the location of the images, such as correspond to dark areas on the original sheet 27 to which the xerographic plate was exposed.

When sheet 29 is laid on the plate it comes into contact with the surface of coating 22 at a few points, but for most of the area the surfaces are thought to be slightly out of contact so the surfaces may be represented as spaced apart as shown in Figure 12. Since the positively charged image areas 50, 51 and 52 are separated from the conductive backing plate 21 by a very thin layer of insulating material 22, the capacitance between the charged areas and the plate 21 is high so that a large part of the electrostatic fields extending from the positive charges on the images will terminate in induced negative charges in backing plate 21 indicated by groups of minus signs 148 below each image area, and only a small proportion of the total lines of force will extend outward from the positive charges into the space above the plate. Electrometer readings of the charges on the image areas, however, may indicate that they have a potential above ground of several hundred volts.

As the high potential positive ion source 23 passes over the back of sheet 29 from right to left, positive ions are driven toward the sheet by the electric field produced by holding the control grid 25 at a positive potential of several hundred volts above ground potential, preferably at 800 to 1000 volts. These positive ions are believed to deposit their charges on the back of sheet 29 to form a fairly uniform charge layer 53 probably by a process in which the positive ions receive electrons from the surface of the sheet and drift away as neutral gas molecules. While a sufficient charge may be built up on sheet 29 by a single pass of the ion source, it is also possible to gradually build up the charge by several trips of the source across the sheet.

It is believed that the high potential layer 53 of positive charges induces further negative charges in backing plate 21 as indicated by the second row of minus signs 49. Since layer 53 is spaced much further from plate 21 than images 50–52, the capacitance is much lower and there will be much fewer charges on an area of layer 53 when it is at a given potential than are present on an image of the same area at the same potential. The electric field extending from layer 53 normal to plate 21 is sufficient, however, to produce a transfer of charges across the space between layer 22 and sheet 29 in the areas not occupied by images 50–52 to produce a negative charge layer 54 on the face of sheet 29 and an equal number of positive charges 55 on coating 22. In the areas occupied by images 50, 51, and 52, however, no charge transfer apparently takes place unless the field is raised to a much higher value.

It is believed that the charge transfer is mainly a result of gas ionization and/or possibly field emission in some cases brought about by the intense electric field in the space between the surfaces of layer 22 and sheet 29. The electric field, when sufficiently intense, accelerates ions (which normally are present) existing in the space into collisions with nearby air molecules thereby creating additional ions which similarly collide with molecules to create more ions, etc. Also, ions may collide with the surfaces defining the space creating additional ions through the collisions. The many ions travelling in the space deposit on the insulating surfaces defining the space as directed and controlled by the electric field, thereby producing the transfer of charge or the deposition of charge on the surface of sheet 29 (and probably to some extent on layer 22) in complete conformity with the configuration of charge existing on the surface of coating 22 so that the newly deposited charges conform in minute detail to the original pattern, it is thought. According to this invention, it has been found possible to transfer charge to a new surface so that the transferred charge reflects completely the slight gradations in charge existing on a first surface. A sufficiently intense electric field would be produced in the space between layer 22 and sheet 29 by applying a charge of several hundred volts on the back of the sheet.

It is well-known that when highly insulating surfaces are separated sparking or electric discharges frequently take place. If these surfaces are developed with electroscopic powder, it is usually found that many random electrostatic patterns of lines in the form of "trees," "stars" and other irregular markings are present. These have become known in the art as "Litchtenberg figures." It has been found that by employing the techniques of the present invention such patterns are avoided and that the transfer of charge appears to be uniformly proportional to the electrostatic image on the first surface. It is believed that the reason for this lies, at least in part, in the fact that either one or both insulating layers is backed up by a conductive layer. This has the effect of limiting the electric field in the air gap during separation, so that as the gap becomes wider the high fields which could cause a spark type of discharge cannot occur. It is thought that as long as the spacing is close (up to, say, 90 microns) the air gap is not long enough to allow the discharges to form channels, which are characteristic of sparking, but that a uniform area discharge takes place. Also, as soon as some discharge takes place the charges deposited on the insulating surfaces will reduce the field in the air gap and stop further discharge. Thus, on peeling the layers apart the discharge will take place uniformly along the line of peeling while the gap is still small, and as the gap widens the field will drop below a value which will sustain further charge transfer.

It is well-known from studies of the breakdown of air gaps that there is a threshold potential gradient below which air ionization discharge does not occur and that this threshold field strength necessary to cause breakdown increases as the air gap becomes shorter. Thus, for a 90-micron air gap it requires about 10 volts per micron or a total of 900 volts across the air gap to cause air ionization. For a 50-micron air gap it takes over 12 volts per micron to breakdown the air but since the gap is shorter the total voltage in the air gap needs to be only 600 volts. For shorter gaps the strength increases approximately as follows:

| | Volts per micron |
|---|---|
| 40 microns | 13.5 |
| 30 microns | 16 |
| 20 microns | 21 |
| 10 microns | 36 |

The nature of electric discharges between closely spaced insulators has not heretofore been very extensively studied. It is of interest, however, to compare the foregoing analysis with studies of spark breakdown between conductors. See Cobine, "Gaseous Conductors" (1st Ed. McGraw-Hill, 1941) especially sec. 7.8 and Figures 7.7, 7.8, and 7.16.

In an attempt to simplify description of the happenings during charge transfer, the term "field discharge" is used in the claims and is intended to mean that form of limited discharge within the scope of this invention as, for example, as is described above, which results in charge transfer to an adjacent surface in true conformity to a charge pattern brought about through the application of intense electric fields at short air gaps (less than 90 microns), which, however, are not intense enough to create spark discharge or, because of the close proximity of the adjacent insulating surfaces, spark discharge is prevented due to the limitations placed on the paths of travel of the ions in this space. Although it is presently believed that air ionization accounts for substantially all of the charges transferred in most instances, it is to be realized, however, that, depending on the distances between the insulating surfaces, the materials comprising the surfaces, and the fields applied, other phenomena such as, for example, field emission or the like may come into operation and may to some extent cause image formation through charge transfer and variances in result from air breakdown or air ionization theory. These other mechanisms are also intended to be included within the definition of field discharge.

Returning now to the discussion of sheet 29 and layer 22, it will also be noticed that when a charge is applied to the top face of sheet 29 not all the voltage will appear across the air gap but some of the voltage drop will occur through sheet 29 and some through layer 22. However, since these dielectric constants are higher than that of air, and may be in the order of 2 to 6 or more, this will have the effect of concentrating much of the potential drop across the air space between layer 22 and sheet 29 so that the field in this region eventually attains that necessary to cause field discharge and charge deposition on sheet 29.

If sheet 29 clings closely to layer 22 during the preliminary transfer step of Figure 3, so that the air gap is very short, it is possible that very little or no ionization transfer will take place during the step of applying the charge to the sheet 29 but in this case the transfer will take place progressively as the sheet is peeled off. During peeling the air gap is widened along the line of peeling. At the same time, since the charge on the back of the sheet remains constant while the capacitance to grounded backing plate 22 decreases as the gap widens the voltage on the sheet increases with separation according to the well-known equation for capacitance of a parallel plate condenser, so that the field strength stays nearly constant until a gap spacing is reached where the ionization threshold is exceded thereby allowing field discharge to take place resulting in charge deposition on insulating sheet 29. The resulting transfer of charges rapidly reduces the field intensity until breakdown and deposition stop.

No charge transfer normally takes place in the space above the image areas 50, 51 and 52 because the direction of the field extending outward from these areas is in opposition to the field produced by charge layer 53 so that the resultant field comprises the field from charges 53 reduced by the opposing field from charges 50, 51 and 52. Considering the insulating surfaces as electrodes, it will be apparent that the field strength between them will be the algebraic sum or resultant of the fields produced by the charges on the image or background areas and any added field imposed during the transfer step. The result is an electrostatic pattern on the face of sheet 29 comprising uncharged image areas surrounded by a negatively charged background area. On development with a negatively charged powder, the powder particles are repelled by negative charges 54 in the background areas but adhere to the uncharged image areas, probably because of an electrostatic field extending through the sheet from positive layer 53.

If the transfer field is increased to a point where some negative charges are transferred to the sheet 29, even in the image areas 50, 51 and 52 a developable image of almost equal quality can still be obtained since the charge transferred in the nonimage or background areas is so much greater that a charge differential will be preserved. The electrostatic lines of force will still have a pattern similar to that illustrated in Figure 13.

In order to obtain images of good quality and uniformity it is essential that the sheet 29 be brought into uniform contact or close spacing to the layer 22 at all points, and this is most readily achieved by pressing or drawing the sheet firmly against the surface. With very flexible and smooth materials the electrostatic attraction developed by the charge layer 53 will sometimes be sufficient to draw the sheet tightly against the plate surface. With irregular and stiffer sheets some auxiliary pressure applying means may be required.

Figure 13:
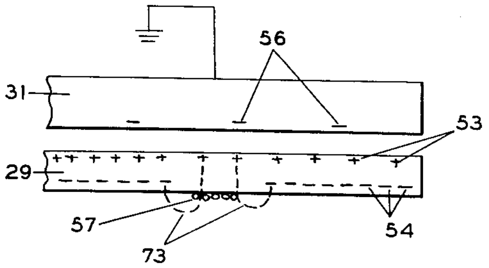

Figure 13 is representative of the possible field conditions present at the time of development of an image on sheet 29 with a negatively charged powder by the development system shown in Figure 4. In this development system the sheet 29 is backed by a conductor, such as 31. Since the back of sheet 29 which carries charge layer 53 is brought against the conductor, some of its charges can pass over and flow to ground, reducing the strength of the charge in the layer. Negative charges 56 are induced in conductor 31 by an remaining positive charges in layer 53 so that much of the field from layer 53 is effectively cancelled. Now, as negatively charged developing powder is brought against the face of sheet 29, the negative particles are repelled from areas of the face which have a negative charge 54, but they are driven to the uncharged face areas which correspond to the positions of image areas 50, 51 and 52 on the xerographic plate to form powder deposits or images 57. The field which attracts the powder to the sheet in this area is believed to be due mainly to the fringing fields 73 from negative charge layer 54 which extends into the air and then curves and passes into the sheet and terminates on positive charges still present in layer 53 or induced positive charges in conductor 31.

Figure 14:
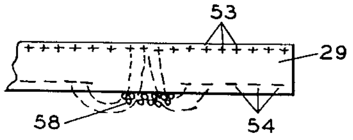
Figures 13 and 14 illustrate certain theories of development.

The conditions which may prevail with the development method of Figure 11 are shown in Figure 14. Here, no backing plate is provided so the effect of layer 53 in attracting powder is greater and a heavier powder deposit 58 is attracted to the image area. This development method permits the use of leaner powder-carrier mixtures which have less tendency to release powder onto background areas and hence cleaner copies are possible by this development method.

In most case it is desired to obtain xerographic positive images from exposure to positive originals. However, reversals from negative to positive or positive to negative can be obtained by using a powder carrying a charge of the same sign as the original electrostatic image. Thus, with a positive image on layer 22 a powder can be used which carries a positive charge because of its triboelectric relationship to a granular carrier material or as a result of a deliberate charging step as by blowing the powder through a positively ionized electric discharge. The powder in these cases will deposit on the negatively charged areas, such as 54. In case exposure was made to a photocopy negative, the powder will deposit on areas which were white lines on the negative.

Figures 15, 16, 17, 18:
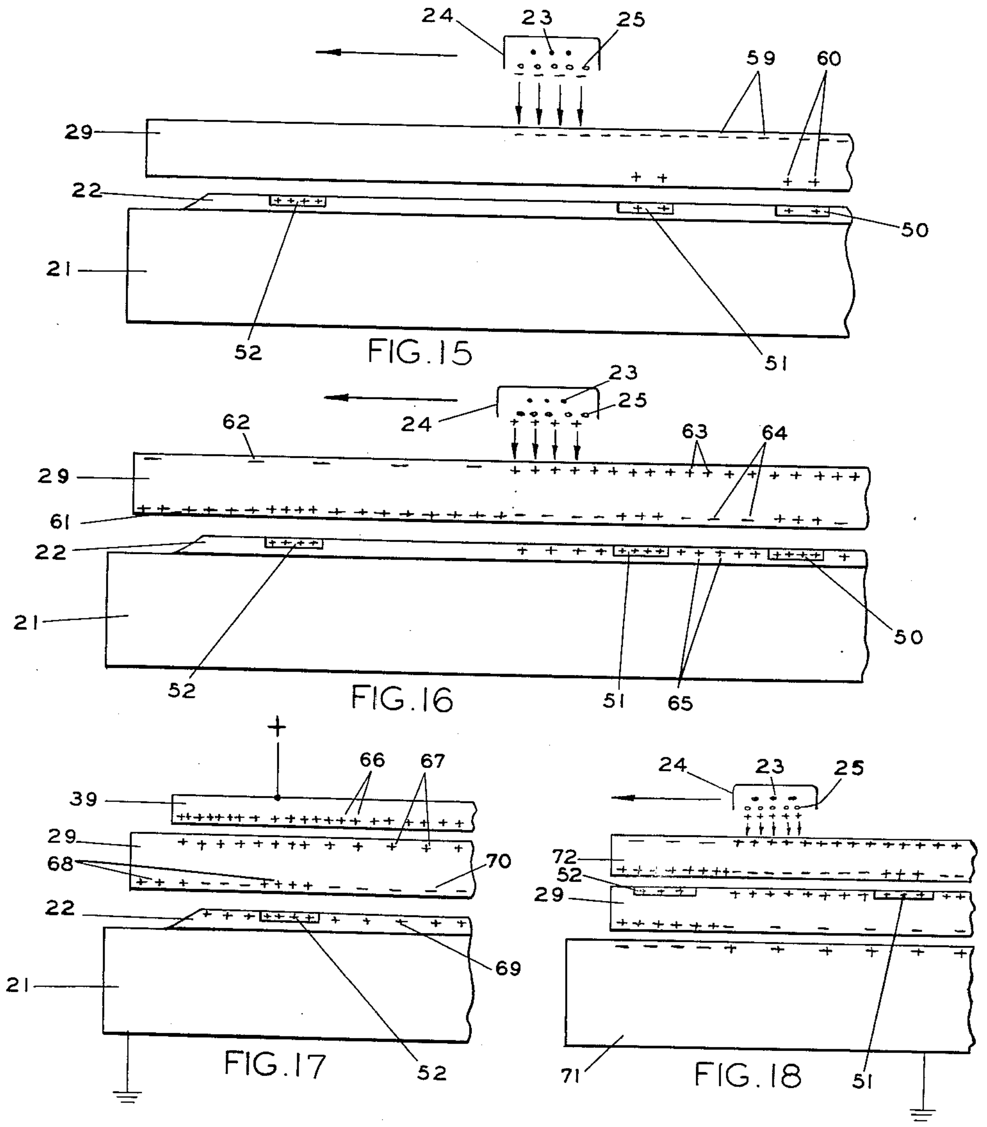
Figure 15 illustrates a theory of operation of a modified transfer method.
Figure 16 illustrates a theory for another operating method.
Figure 17 depicts a further modification in operation.
Figure 18 illustrates a method of reversing a transferred image.

Figure 15 illustrates the charge relationship which is present when transfer is effected by passing an ion source which is of opposite polarity to the image over the back of sheet 29 in the transfer step of Figure 3. For example, with positively charged image areas 50–52 on coating 22 as a negative ion source 23 and negatively biased grid electrode 25 are used to spray a layer 59 of negative charges on the back of sheet 29. When enough charges have been deposited to increase the field above the image areas to air breakdown conditions while the sheet and layer are in parallel position or while the sheet is being peeled away from the layer, air ions, both positive and negative, will move in the space and to the surfaces defining the space, thus, reducing the positive charge on the images of layer 22 and at the same time creating positively charged areas 60 on sheet 29, as shown for image areas 50 and 51 is Figure 15. The threshold of air ionization or field discharge is reached in the image areas before breakdown begins in the background areas. By controlling the time and intensity of the ionic current and the biasing voltage of grid 25, the potential of layer 59 can be limited to prevent any charge transfer in the background areas. However, should the charge 59 be increased until ionization takes place in the background areas, an image will still appear on sheet 29 since the charge transferred in the image areas will be greater at any field strength than that in the nonimage areas.

With negative charging of sheet 29, however, we have found another practical reason for limiting the negative potential applied to the sheet. With negative charging of the sheet 29, uncontrolled sparks or uncontrolled gas ionization discharges appear to take place rather easily, probably during separation of the layers giving rise to "trees" or Lichtenberg figures upon development with powder.

With positive charging of sheet 29 to transfer either positively or negatively charged images we have made the surprising discovery that "trees" or Lichtenberg figures are almost never encountered when transfer fields are applied which are above the air ionization threshold for either the image or the background areas, depending on the method used, and below the spark breakdown strength of the insulating layers 22 and 29. When a deliberate effort is made to produce uncontrolled spark discharge effects by very high charging the effects do not appear as with negative as sharply-defined "trees" but only as gradual graduations of potential which do not produce very noticeable background patterns on development. The advantages are particularly noteworthy where positive transfer charging is used to transfer positively charged images, as shown in Figures 12, 16 and 17. This can be understood when it is appreciated that the field is in such direction during removal of the transfer sheet that any ionization discharges which do take place will deposit additional negative charges on sheet 29. When the sheet is developed with negatively charged powder, the powder will adhere to the positive image areas but will be repelled both by the negative background and by any special areas of high negative charge resulting from uncontrolled ionic discharge.

Figure 16 shows the charge relationship when sheet 29 is precharged on its face with a positive layer 61 by the procedure of Figure 6. When the positive charge layer 61 is deposited in the precharging step a negative charge layer 62 of lesser charge density is produced on the opposite face of sheet 29 by transfer through air from metal plate 36. The positively charged face is brought against image layer 22 and positive ions are then deposited on the back of sheet 29 as a charge layer 63 and causing air ionization and charge deposition in the background areas in such direction as to reverse the polarity on sheet 29 and form negative areas 64. In the image areas little or no charge transfer occurs so that the face assumes a condition in which it carries a positive image surrounded by negative background. This, of course, provides extremely desirable conditions for development with negatively charged powder. We have determined by electrometer measurements that a substantial polarity reversal is produced in the background to yield the negatively charged areas 64 on the face of sheet 29 and corresponding positive charges 65 on layer 22.

Figure 17 illustrates the electrical conditions prevailing with the transfer arrangement of Figure 7 in which a metal foil or plate 39 is laid over the back of the transfer sheet 29 during the transfer step. The charging ions do not reach sheet 29 directly but deposit on plate 39 to raise it to a high potential. It is not essential to use an ion source for charging. The plate 39 can be connected directly to a positive terminal of several hundred votls, such as 400 to 1000 volts, as indicated in Figure 17. The conductive plate distributes the potential uniformly over its face as a positive charge layer 66 and some of the charge may transfer to sheet 29 to form charge layer 67 on the back of the sheet. The sheet 29 is represented as having received a precharging step in which a positive charge layer 68 was placed on the face of the sheet by the step shown in Figure 6. The field applied by charges 66, 67 produces, either before or during peel-off, a transfer of positive charges from layer 68 to coating 22 in the non-image areas to produce positive layer 69, and if the field is high enough a negative charge layer 70 will be formed on sheet 29 in the non-image areas. The positive charge layer 68 is retained by sheet 29 in the image areas.

This arrangement has the advantage that part of the transfer field is produced by charges which remain in plate 39. The charge on the back of the sheet 29 will be lower than with the other methods so that when plate 39 is removed or grounded the image on the face of the sheet will have less disturbing influence from fields extending through the sheet which are sometimes nonuniform due to local variations in conductivity and dielectric constant of the sheet 29.

Figure 17 may also be referred to as representative of the charge relationship which may be present with a roller transfer of the type shown in Figure 9.

A further advantage of using a metal backing during transfer, as disclosed in Figures 7, 8, 9 and 17, is that uncontrolled sparking and uncontrolled gas ionization phenomena are greatly reduced or eliminated. This is particularly apparent when the metal backing is held at a set potential during transfer and removal of the image, as by connecting the backing electrode directly to a potential source.

The transfer methods represented by Figures 16 and 17 have yielded the best results in our investigations and are generally preferred over the other methods disclosed.

Transfer of an electrostatic image by the methods disclosed herein does not destroy the image on the coating 22 although it is somewhat reduced in intensity. We have been able, by repeating the transfer steps, to produce two or more good transferred electrostatic images from one electrical image on the xerographic plate although the quality degenerates somewhat on successive transferred images. Finally, the coating 22 itself can be developed with powder after one or more electrostatic transfers have been taken from it.

Figure 18 illustrates a method for producing a mirror-reversal of an image. This is accomplished by placing a sheet 29 to which an image has been transferred on a grounded metal plate 71 with its image facing outward. A second insulating sheet 72 is then placed against the face of sheet 29 and the ion source is passed over the assembly to effect a transfer of the image to sheet 72 where it can then be developed. The same variations in the transfer techniques can be practiced as in making the original transfer.

The methods of the present invention have many advantages. One of the greatest is the elimination of the requirements for plate cleaning. In the prior art where development was effected directly on a xerographic plate surface, there was always found to be some residual powder left on the plate after the powder image was transferred to paper. This has required a cleaning step after each transfer was made and has complicated the xerographic processing method and apparatus. Furthermore, with most resinous powders a film has eventually formed on the plate which required removal by a solvent cleaning technique. By using the present invention, with development directly on paper or other sheet material, there is no transfer of the powder image required and no cleaning steps are needed. There is also less wear on the xerographic plate so that its life is greatly extended.

With development on the final surface a wider choice of resins for the developing powder are available since there is little need to avoid tacky materials which would quickly build up a film or smear on a zerographic plate if conventional development were used.

Other advantages include the greater convenience of development since the flexible sheet materials can be bent into loops and other curves for development; whereas, most xerographic plates are rigid or have only limited flexibility.

The term "insulating" as used herein is intended to refer to materials which have sufficiently high resistance under conditions of use to hold an electrostatic image for a period which permits utilization of the image by transfer to another surface or by development. It is obvious that a lower resistance can be tolerated with a more rapid processing cycle.

It is obvious that the term "transfer" as used herein does not necessarily refer to the transfer of charges in the image areas, as sometimes the charge on the image areas may stay constant and a transfer take place only in the background areas so that a charge pattern results which corresponds to the pattern of the original electrostatic image. Further, as used herein transfer of charge is not intended to be limited to a transportation of charge from one surface to another but is intended to encompass the charge creation and migration mechanism taking place between the surfaces resulting in deposition in conformity with an original charge pattern on the adjacent surface. It is also appreciated that, while it is sometimes convenient to refer to the transfer of positive charges, the actual mechanism may involve the movement of electrons and of negative and positive ions in directions determined by the field. Also, the transfer of charges need only be sufficient to produce a developable image on the transfer sheet, in which event transfer potentials may be used which are only slightly above the field induced discharge threshold for the system. A substantial image will then remain on the original plate for use in making duplicate transfers.

While the present invention, as to its objects and advantages, has been described herein as carried out in specific embodiments thereof, it is not desired to be limited thereby, but it is intended to cover the invention broadly within the spirit and scope of the appended claims.

What is claimed is:

1. In a method of forming an electrostatic charge pattern on a first surface of insulating material in which the insulating surface is placed in facing physical contact with a second insulating surface bearing an electrostatic charge pattern of a first polarity and in which in order to accomplish charge transfer from said second surface to said first surface a field is applied between said surfaces of an intensity, in the absence of any photoelectric effect, exceeding the threshold of field discharge, the improvement comprising applying to said first surface a uniform electrostatic charge of said first polarity prior to positioning said first surface across said second surface bearing said electrostatic charge pattern.

2. The method of claim 1 in which said first surface comprises a surface of a sheet of paper in dry insulating condition and said second insulating surface comprises the surface of a photoconductive insulating layer of a xerographic plate which has been sensitized and exposed to form an image pattern of the exposure pattern thereon.

3. The method which comprises producing and storing a first electrostatic image on an insulating surface of an image retaining member, charging a first surface of a substantially insulating sheet to a first polarity and placing said first surface of said sheet in facing physical contact with said insulating surface of said image retaining member, peeling said facing surfaces apart, and while said facing surfaces are positioned and disposed in close proximity to one another externally increasing the electric field between said facing surfaces, by applying an additional increment of potential of said first polarity, at least during peeling, to the second surface of said sheet, of an intensity, in the absence of any photoelectric effect, to exceed the threshold of field discharge between said facing surfaces to selectively transfer charges between said facing surfaces, whereby at least after the facing surfaces are peeled apart a second electrostatic image conforming in configuration to said first electrostatic image exists on the first surface of said sheet brought about by electric charge transfer under the resultant fields produced by said first electrostatic image, said charge on said first surface of said sheet and the externally applied field increment.

4. The method of claim 3 in which the electric field is increased by applying a sufficient additional increment of potential to produce a resultant field exceeding the field which is capable of selectively reducing the charge on said first surface of said substantially insulating sheet to zero as a result of a selective transfer of charges, whereby a reversal of the polarity of charge is effected on said first surface of said sheet in areas as controlled by said first electrostatic image to form on said first surface of said sheet a two-polarity image conforming in configuration to said first electrostatic image.

5. The method of claim 3 in which said first polarity is positive and in which the increase in electric field is effected by applying electrostatic charge to the second surface of said sheet while said first surface of said sheet is positioned and disposed in facing contact with said insulating surface of said image retaining member.

6. The method which comprises producing and storing a first electrostatic image of a first polarity on an insulating surface of an image retaining member, charging a first surface of a substantially insulating sheet to said first polarity and placing said first surface of said sheet in facing physical contact with said insulating surface of said image retaining member, peeling said facing surfaces apart, and while said facing surfaces are positioned and disposed in close proximity to one another externally increasing the electric field between said facing surfaces, by applying an additional increment of potential, at least during peeling, to the second surface of said sheet of an intensity, in the absence of any photoelectric effect, to exceed the threshold of field discharge between said facing surfaces to selectively transfer charges between said facing surfaces, whereby at least after the facing surfaces are peeled apart a second electrostatic image conforming in configuration to said first electrostatic image exists on said first surface of said sheet brought about by electric charge transfer under the resultant fields produced by said first electrostatic image, said charge on said first surface of said sheet and the externally applied field increment.

7. The method of claim 6 in which said first polarity is positive and in which the increase in electric field is effected by applying electrostatic charge to the second surface of said sheet while said first surface of said sheet is positioned and disposed in facing contact with said insulating surface of said image retaining member.

References Cited in the file of this patent

UNITED STATES PATENTS

| | | |
|---|---|---|
| 2,221,776 | Carlson | Nov. 19, 1940 |
| 2,277,013 | Carlson | Mar. 17, 1942 |
| 2,297,691 | Carlson | Oct. 6, 1942 |
| 2,503,224 | Trump et al. | Apr. 4, 1950 |
| 2,558,900 | Hooper | July 3, 1951 |
| 2,576,047 | Schaffert | Nov. 20, 1951 |
| 2,693,416 | Butterfield | Nov. 2, 1954 |
| 2,716,048 | Young | Aug. 23, 1955 |
| 2,777,745 | McNaney | Jan. 15, 1957 |
| 2,825,814 | Walkup | Mar. 4, 1958 |
| 2,829,025 | Clemens et al. | Apr. 1, 1958 |
| 2,833,648 | Walkup | May 6, 1958 |

UNITED STATES PATENT OFFICE
CERTIFICATE OF CORRECTION

Patent No. 2,982,647

May 2, 1961

Chester F. Carlson et al.

It is hereby certified that error appears in the above numbered patent requiring correction and that the said Letters Patent should read as corrected below.

Column 4, line 12, strike out "in"; line 50, for "100" read -- 1000 --; column 10, line 14, for "an" read -- any --; line 68, for "is" read -- in --; column 11, line 23, for "graduations" read -- gradations --; line 66, for "votls" read -- volts --; column 12, line 68, for "zerographic" read -- xerographic --.

Signed and sealed this 10th day of April 1962.

(SEAL)
Attest:

ERNEST W. SWIDER

Attesting Officer

DAVID L. LADD

Commissioner of Patents